(12) United States Patent
Stemen et al.

(10) Patent No.: US 9,075,652 B2
(45) Date of Patent: Jul. 7, 2015

(54) IDLE TIME SERVICE

(75) Inventors: Patrick L. Stemen, Seattle, WA (US);
Nicholas S. Judge, Bellevue, WA (US);
Tristan A. Brown, Bellevue, WA (US);
Dean L. DeWhitt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 682 days.

(21) Appl. No.: 12/973,556

(22) Filed: Dec. 20, 2010

(65) Prior Publication Data
US 2012/0159209 A1    Jun. 21, 2012

(51) Int. Cl.
*G06F 1/32*    (2006.01)
*G06F 9/48*    (2006.01)

(52) U.S. Cl.
CPC ............ *G06F 9/4893* (2013.01); *Y02B 60/144* (2013.01)

(58) Field of Classification Search
CPC .............................................. G06F 2212/1028
USPC ....................................................... 713/320
See application file for complete search history.

(56) References Cited

U.S. PATENT DOCUMENTS

| | | | |
|---|---|---|---|
| 6,161,187 A | 12/2000 | Mason et al. | |
| 7,058,824 B2 | 6/2006 | Plante et al. | |
| 7,093,141 B2 | 8/2006 | Elnozahy et al. | |
| 7,146,439 B1 * | 12/2006 | Ofer et al. | 710/45 |
| 7,203,854 B2 | 4/2007 | Luke et al. | |
| 7,243,243 B2 | 7/2007 | Gedeon | |
| 7,272,731 B2 * | 9/2007 | Chaiken | 713/300 |
| 8,060,884 B2 * | 11/2011 | Oswald | 718/104 |
| 8,281,175 B2 * | 10/2012 | Blackburn et al. | 713/323 |
| 8,589,650 B2 * | 11/2013 | Yokoya et al. | 711/165 |
| 2005/0125701 A1 * | 6/2005 | Hensbergen et al. | 713/320 |
| 2007/0245163 A1 | 10/2007 | Lu et al. | |
| 2009/0319812 A1 | 12/2009 | Laughlin | |
| 2010/0023788 A1 | 1/2010 | Scott et al. | |

FOREIGN PATENT DOCUMENTS

| | | |
|---|---|---|
| CN | 1656435 | 8/2005 |
| CN | 101365192 | 2/2009 |

OTHER PUBLICATIONS

"9 Ways How Windows 7 Will Save Battery Life", Retrieved at << http://windows7center.com/news/9-ways-how-windows-7-will-save-battery-life/ >>, Apr. 22, 2009, pp. 9.
"Foreign Office Action", CN Application No. 201110429228.9, Jan. 6, 2014, 11 Pages.
"Foreign Office Action", CN Application No. 201110429228.9, Sep. 19, 2014, 13 Pages.
"Foreign Office Action", CN Application No. 201110429228.9, Mar. 27, 2015, 10 Pages.

* cited by examiner

*Primary Examiner* — Kim Huynh
*Assistant Examiner* — Eric Chang
(74) *Attorney, Agent, or Firm* — John Jardine; Kate Drakos; Micky Minhas

(57) ABSTRACT

In embodiments of an idle time service, it can be determined that processing on a device is in an idle state. An execution duration of applications that are scheduled to be executed by a processor of the device can then be extended to reduce power consumption by the device. In other embodiments, it can be determined that an application configured to execute on a device is a background application. The execution duration of the background application can then be extended to reduce power consumption by the device.

19 Claims, 6 Drawing Sheets

IDLE TIME SERVICE

BACKGROUND

The energy efficiency and battery life of a computing device, such as a mobile phone or a laptop, can be negatively impacted by the processor executing background applications that do not require direct user interaction, such as maintenance or communication activities. From the perspective of a user, background applications may add little value to the overall experience of using a computing device because the background applications cannot be directly interacted with by the user. Furthermore, background applications are often inefficient and negatively impact the battery life of mobile devices.

SUMMARY

This summary is provided to introduce simplified concepts of an idle time service that is further described below in the Detailed Description. This summary is not intended to identify essential features of the claimed subject matter, nor is it intended for use in determining the scope of the claimed subject matter.

An idle time service is described. In embodiments, it can be determined that processing on a device is in an idle state. An execution duration of applications that are scheduled to be executed by a processor of the device can then be extended to reduce power consumption by the device. Processing on the device can be determined to be in the idle state when detecting that the device has not received a user input for a specified amount of time, and/or when determining that the applications that are scheduled to be executed on the device are background applications. The execution duration of the applications can be extended by increasing an idle duration of the applications that are scheduled to be executed on the device; increasing a duration of a timer tick of a system timer; and/or by modifying a processor schedule to increase the idle duration of the applications that are scheduled to be executed on the device.

In other embodiments, it can be determined that an application configured to execute on a device is a background application. The execution duration of the background application can then be extended to reduce power consumption by the device. The application can be determined to be a background application when receiving a request to register the application as the background application; by monitoring the application during execution to determine that the application is the background application; and/or when determining that the application is not configured for user interaction. The execution duration of the background application can be extended by increasing an idle duration of the background application and/or by modifying a processor schedule to increase an idle duration of the background application.

BRIEF DESCRIPTION OF THE DRAWINGS

Embodiments of an idle time service are described with reference to the following drawings. The same numbers are used throughout the drawings to reference like features and components.

DETAILED DESCRIPTION

An idle time service is described. In embodiments, the idle time service can determine that processing on a device is in an idle state. To determine that processing on the device is in an idle state, the idle time service can detect that the device has not received a user input for a specified amount of time. Alternatively or in addition, the idle time service can determine that processing on the device is in an idle state by determining that applications that are scheduled to be executed by a processor of the device are background applications. After determining that processing on the device is in an idle state, the idle time service can extend an execution duration of applications that are scheduled to be executed by the processor of the device to reduce power consumption by the device. The idle time service can extend the execution duration of the applications by increasing a duration of a timer tick of a system timer. Alternatively, the idle time service can extend the execution duration of the applications by modifying a processor schedule to increase an idle duration of the applications that are scheduled to be executed by the processor. The execution duration can be extended by software or an operating system implementation without changing the underlying hardware of a device, and still improve power management.

In other embodiments, the idle time service can determine that an application configured to execute on a device is a background application. For example, the idle time service can receive a request to register the application as the background application. The idle time service can then determine that the application is the background application based on the request. Alternatively or in addition, the idle time service can monitor the application during execution to determine that the application is the background application. The idle time service can then extend an execution duration of the background application to reduce power consumption by the device. In an embodiment, the idle time service extends the execution duration by modifying a processor schedule to increase an idle duration of the application.

While features and concepts of the described systems and methods for an idle time service can be implemented in any number of different environments, systems, devices, and/or various configurations, embodiments of an idle time service are described in the context of the following example devices, systems, and configurations.

Figure 1:
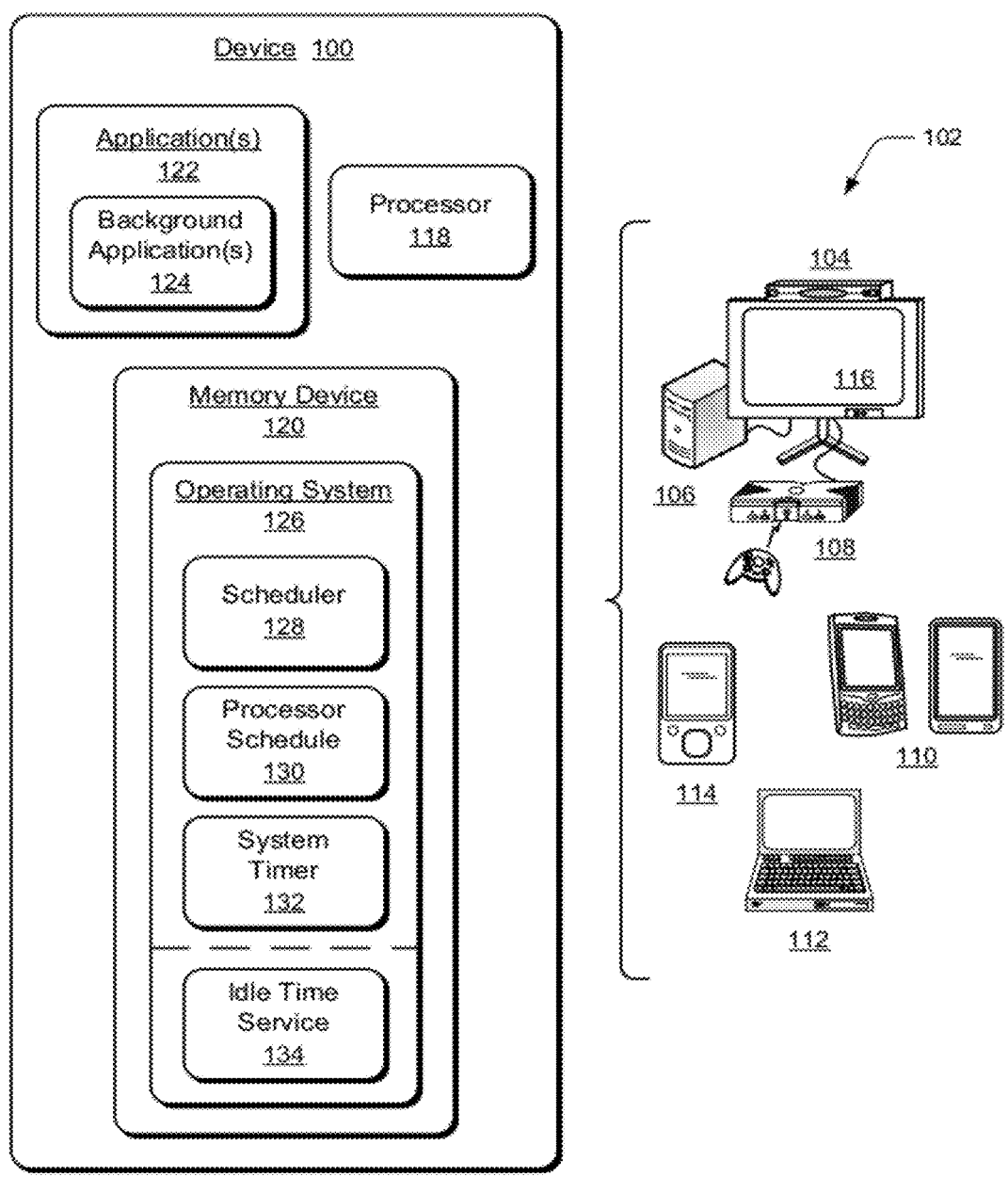
FIG. 1 illustrates an example device in which embodiments of an idle time service can be implemented.

FIG. 1 illustrates an example device 100 in which various embodiments of an idle time service can be implemented. The example device 100 may be configured as any type of client device 102. Any of the various client devices 102 can be configured as the device 100, and may be implemented with any number and combination of differing components as further described with reference to the example device shown in FIG. 8.

A client device 102 can be implemented as any one or combination of a television client device 104, a computer device 106, a gaming system 108, an appliance device, an electronic device, and/or as any other type of device. The various client devices can also include wireless devices implemented to receive and/or communicate wireless data, such as any one or combination of a mobile phone 110 (e.g., cellular, VoIP, WiFi, etc.), a portable computer device 112, a media player device 114, and/or any other wireless device. A client system can include a respective client device and a display device 116.

The device 100 can include one or more processors 118 (e.g., any of microprocessors, controllers, and the like) which process various computer-executable instructions to control the operation of the device. The device also includes one or more memory devices 120 (e.g., computer-readable storage media) that enable data storage. A memory device can be implemented as any type of memory, storage media, and/or suitable electronic data storage.

The memory device 120 provides data storage mechanisms to store various applications 122 that can be executed by processor 118. The applications 122 can include interactive applications that are configured for interaction by a user of the device 100. Examples of interactive applications include web browsing, messaging, gaming, and word processing applications. Additionally, the applications 122 can include background applications 124. As described herein, background applications are applications that are not visible to the user and/or are not capable of being interacted with by the user. Examples of background applications can include maintenance applications (e.g., automatic defragmentation applications and software updating applications), communication applications, networking applications (e.g., network address retrieval applications and automatic data synchronization applications), or other applications that process in the background without user interaction.

Memory device 120 also includes an operating system 126 that can be maintained as a software application with the memory device and executed by processor 118. The operating system includes a scheduler 128, a processor schedule 130, and a system timer 132. The system timer is implemented to increment or decrement at a set frequency, referred to herein as a "timer tick", which is configurable, and to interrupt processor 118 when the timer tick expires, such as by reaching a value of zero. For example, if the timer tick is configured to 10 ms, the system timer will interrupt the processor every 10 ms. When the system timer interrupts the processor, the processor is implemented to execute applications 122 that are ready for execution from the processor schedule.

The scheduler 128 is implemented to schedule applications 122 for execution by processor 118 in the processor schedule 130. The scheduler receives requests from the applications for the processor to execute application tasks at particular frequencies. For example, an application may request that the processor execute a particular application task every 15 ms. The scheduler can then be implemented to schedule application tasks by placing the application tasks in the processor schedule along with corresponding software timers. An application task is ready to be executed by the processor when the timer expires.

When processor 118 is interrupted by system timer 132 due to the timer tick expiring, the scheduler 128 is implemented to access the processor schedule to determine if any software timers have expired. If the processor determines that no software timers have expired, the processor does nothing. Responsive to determining that one or more software timers have expired, the processor is implemented to execute corresponding application tasks until all of the application tasks that are ready for execution are completed. After the processor completes execution of all of the scheduled application tasks, the processor is idle until the next time that the system timer interrupts the processor.

The power consumption by the device 100 is directly related to the utilization of processor 118. When processor 118 is idle, therefore, the amount of power consumed by the device 100 can be significantly reduced. Reducing the amount of power consumed can result in increased battery life when the device 100 is a mobile device, such as a laptop or mobile phone. Therefore, increasing the amount of time that the processor is idle reduces power consumption by the device and results in increased battery life.

Device 100 includes an idle time service 134 that can be implemented as computer-executable instructions, such as a software application, and executed by one or more processors to implement the various embodiments described herein. The idle time service may be implemented as a component within the operating system 126 to enable the idle time service to directly interact with the scheduler 128, the processor schedule 130, and the system timer 132.

In various embodiments, the idle time service 134 is implemented to extend an execution duration of applications 122 that are scheduled to be executed on device 100 to reduce power consumption by the device. The execution duration of an application is the total amount of time for an application to be executed, from start to finish, by the processor. As described herein, execution of an application encompasses execution of application tasks and/or application instructions of the application. The idle time service is implemented to change the schedule of application tasks to delay them, or to extend the idle time by delaying the next timer tick expiration.

Figure 2:
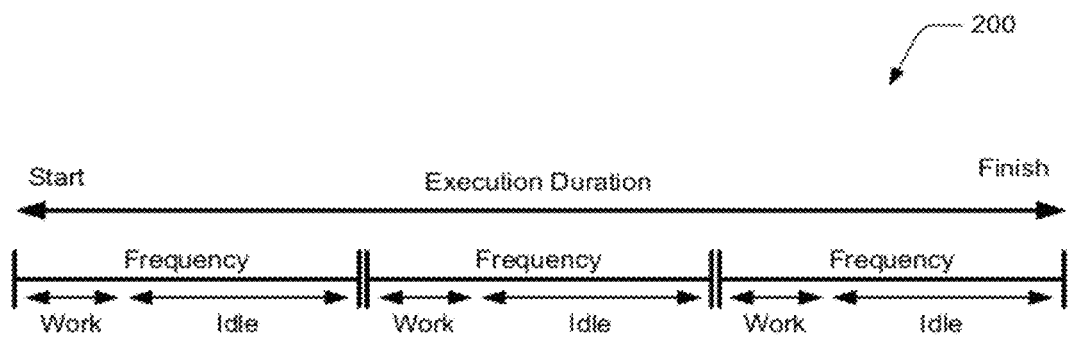
FIG. 2 illustrates an example of an execution duration for an example application in accordance with one or more embodiments.

FIG. 2 illustrates an example 200 of an execution duration for an example application. The execution duration can be divided into multiple frequencies. Each frequency includes both a work duration corresponding to the amount of time that the processor executes an application task as well as an idle duration corresponding to the amount of time that the processor is executing other application tasks or is idle. Consider for example that the execution duration is 60 ms, the duration of each frequency is 20 ms, the work duration for each frequency is 5 ms, and the idle duration for each frequency is 15 ms. In this example, therefore, the idle duration for the total 60 ms execution duration would be 45 ms. However, if the execution duration were increased to 120 ms, the work duration would remain at 15 ms but the idle duration would increase to 105 ms. It is to be appreciated, therefore, that extending the execution duration of an application increases the idle duration which, as described above, reduces the power consumption of device 100.

In an embodiment, the idle time service 134 described with reference to FIG. 1 is implemented to determine that processing on device 100 is in an idle state before extending the execution duration of the applications 122. As described herein, processing on the device is in an idle state when the only applications that are scheduled to be executed by the processor 118 in processor schedule 130 are background applications 124. It is to be appreciated that extending an execution duration of an interactive application, such as a web browser application, may result in an undesirable experience using the device. For example, extending an execution duration of a web browser application may cause what appears as a glitch to a user when interacting with the web browser application. In contrast, background applications often have no identifiable value to the user and often require significant processor utilization and corresponding power consumption. Furthermore, background applications are usually not time critical. Therefore, the execution duration of the background applications can be extended without impacting the overall experience of using the device.

The idle time service 134 can determine that processing on device 100 is in an idle state in a variety of different ways. In an embodiment, the idle time service determines that processing on the device is in an idle state by detecting that the device has not received a user input for a specified period of time, which may indicate that all of the applications 122 that are currently scheduled to be executed by the processor are background applications 124. Alternatively or in addition, the idle time service 134 can determine that processing on device 100 is in an idle state by determining that all of the applications that are scheduled to be executed by the processor are background applications. For example, the processor schedule 130 may include an indication of whether an application is a background application. Therefore, the idle time service may access the processor schedule to determine whether the applications scheduled for execution are background applications. Alternatively or in addition, the idle time service can determine that processing on the device is in an idle state if the device is configured to suspend after inactivity and/or no applications are requesting that the device remain active.

Responsive to determining that processing on the device 100 is in an idle state, the idle time service 134 is implemented to extend an execution duration of the applications 122 that are scheduled to be executed by the processor 118 to reduce power consumption by the device 100. In an embodiment, the idle time service 134 is implemented to extend the execution duration of applications 122 by extending an idle duration of the applications.

Figure 3:
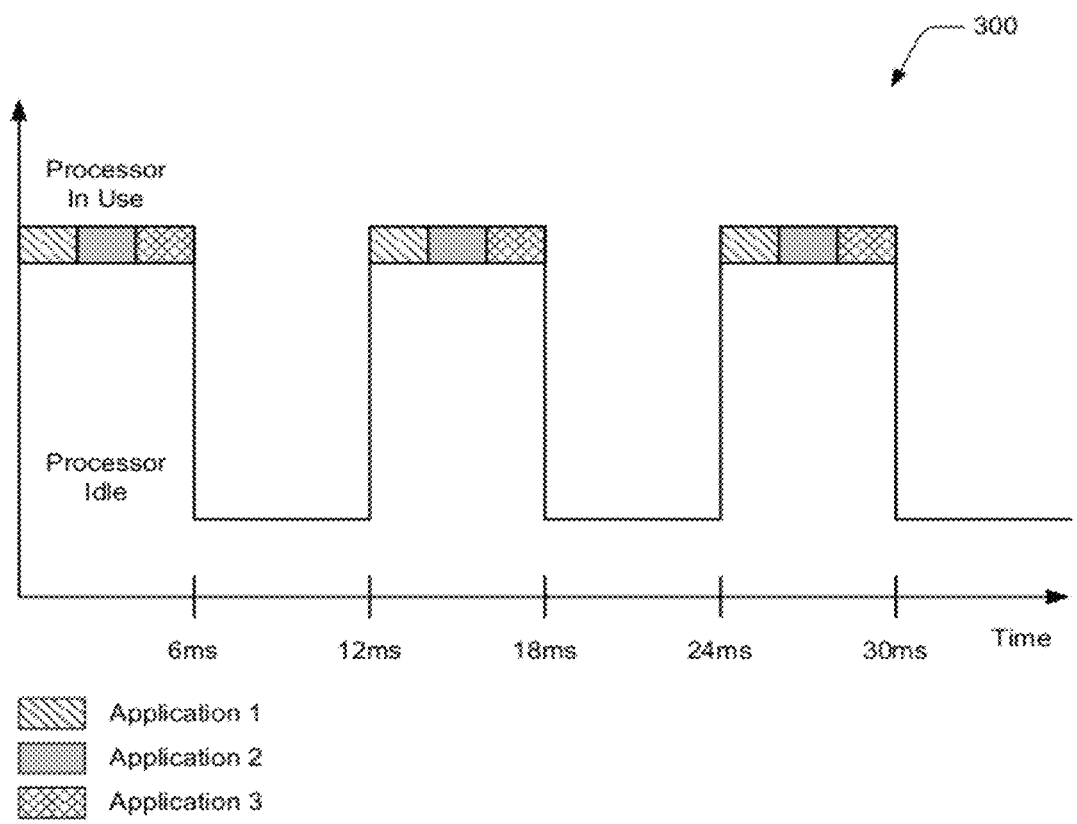
FIG. 3 illustrates an example of processor utilization for three example applications in accordance with one or more embodiments.

FIG. 3 illustrates an example 300 of processor utilization for three example applications: application 1, application 2, and application 3 each identified by a different pattern for illustrative purposes. In this example, the frequency is 12 ms and the processor spends 6 ms of each 12 ms frequency executing application tasks (2 ms to execute each application task). Therefore, the idle duration for each 12 ms frequency in this example is also 6 ms. The overall processor utilization in example 300, therefore, is 50% (approximately 16.66% of the time is spent executing each of application 1, application 2, and application 3). Conversely, the processor is idle 50% of the time.

Figure 4:
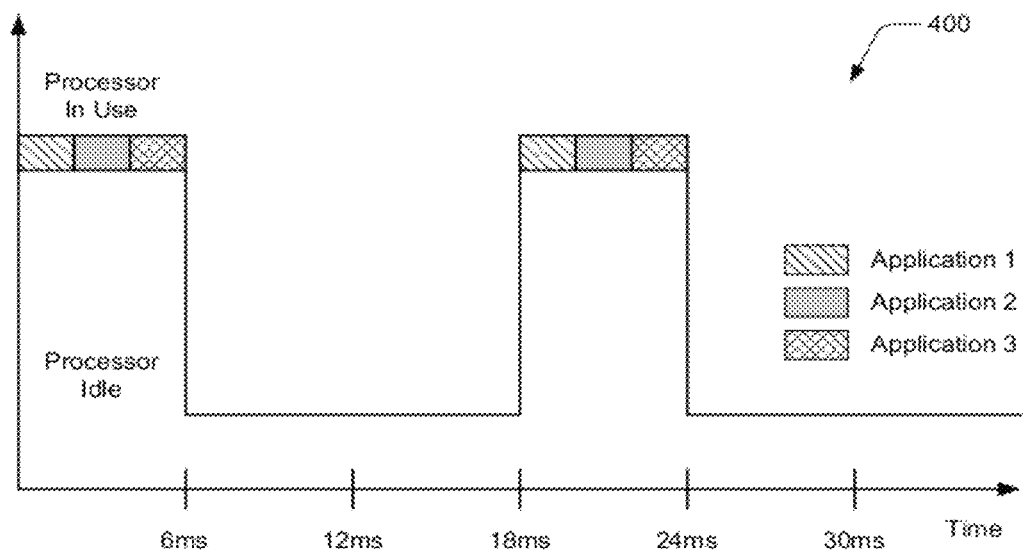
FIG. 4 illustrates an additional example of processor utilization for three example applications in accordance with one or more embodiments.

FIG. 4 illustrates an additional example 400 of processor utilization for the three example applications as shown in FIG. 3. In this example, however, the idle time service 134 described with reference to FIG. 1 has increased the idle duration from 6 ms to 12 ms, which is now a frequency of 18 ms. Therefore, even though the same three applications are being executed by the processor for the same amount of execution time, the processor utilization has decreased from 50%, as illustrated in FIG. 3, to 33.3%. Conversely, the processor is now idle 66.66% of the time in FIG. 4. As discussed above, the power consumption by device 100 is reduced when the processor is idle. It is to be appreciated, therefore, that increasing the idle duration reduces the power consumption and extends the battery life of device 100.

In an embodiment, the idle time service 134 is implemented to extend the execution duration by increasing a duration of the timer tick of the system timer 132. As described above, the system timer interrupts processor 118 when the timer tick expires. When the processor is interrupted, the processor executes the application tasks scheduled for execution in the processor schedule 130. However, if the processor is not interrupted by the system timer, the processor will not access the processor schedule and will not execute the scheduled application tasks. Increasing the duration of the timer tick, therefore, means that the processor is interrupted less frequently which causes the processor to remain idle for longer periods of time. In FIG. 4, for example, the timer tick has been extended from 12 ms (in FIG. 3) to 18 ms which cause the processor to execute the three applications every 18 ms instead of every 12 ms.

In another embodiment, the idle time service 134 is implemented to extend the execution duration by modifying the processor schedule 130 to increase an idle duration for the applications 122 that are scheduled to be executed by the processor 118. The idle time service can be implemented to access and modify the processor schedule to increase the idle duration for each of the applications. Alternatively, the idle time service can be implemented to cause scheduler 128 to modify the idle duration for each of the applications. In FIG. 4, for example, the processor schedule has been modified by increasing the idle duration of each of the three applications by 6 ms.

In various embodiments, the idle time service 134 is implemented to selectively extend execution durations for background applications 124. The idle time service is implemented to determine that an application 122 configured to execute on the device 100 is a background application 124 in a variety of different ways.

In an embodiment, the idle time service 134 can receive a request to register the application 122 as the background application 124. The idle time service 134 can then determine the application is the background application based on the request. The request can be received during programming of the operating system, during installation of the operating system, or any time after installation of the operating system. The request can be received from the application itself, such as by the application programmatically identifying itself to the operating system. Alternatively, the request can be received as a user input to the device, such as by a computer administrator manually selecting an application as a background application. Responsive to receiving the request, the idle time service can then be implemented to register the application as the background application. For example, the idle time service may provide an indication in the processor schedule 130 that the application is the background application.

In another embodiment, the idle time service 134 is implemented to monitor the application 122 during execution to determine that the application is a background application 124. For example, the idle time service can determine the application is not configured for user interaction to determine that the application is a background application. For instance, the idle time service can determine whether the application is configured with a user interface and/or whether the application has received user input. If the application does not have a user interface, or has not received user input, the idle time service can determine that the application is not configured for user interaction and therefore is a background application.

Responsive to determining that an application 122 is a background application 124, the idle time service 134 is implemented to extend an execution duration of the background application to reduce power consumption by the device 100. Unlike the embodiments discussed above, the idle time service in this embodiment can selectively extend the execution duration of an application that is a background application without modifying the execution duration of applications that are not background applications, such as interactive applications.

In an embodiment, the idle time service 134 is implemented to extend the execution duration of the background application by increasing an idle duration of the application. The idle time service can be implemented to increase the idle duration of the application by modifying the processor schedule 130 to increase the idle duration of the application. For example, the idle time service can be implemented to access and modify the processor schedule to increase the idle duration of the application. Alternatively, the idle time service can be implemented to cause scheduler 128 to increase the idle duration of the application.

Figure 5:
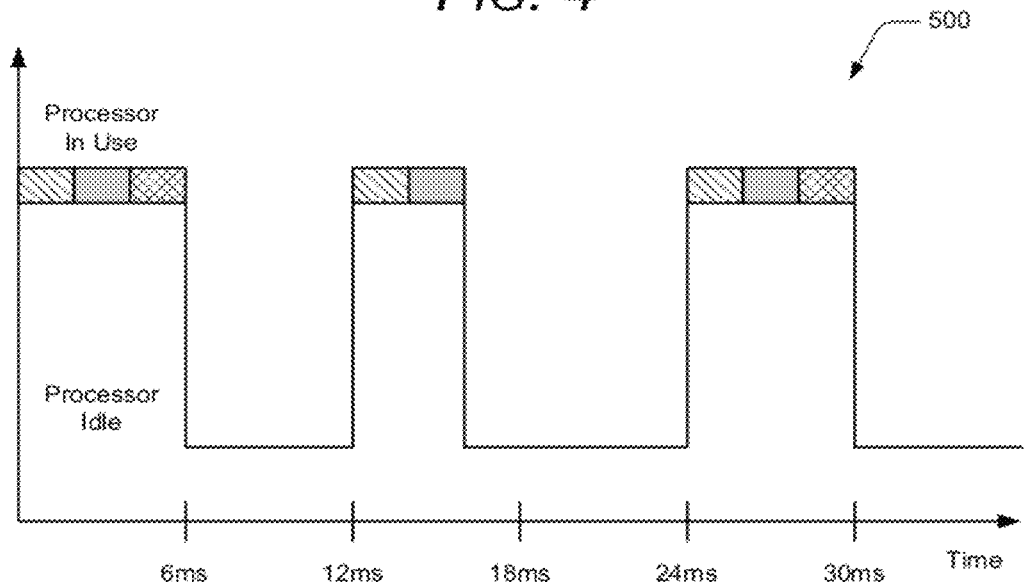
FIG. 5 illustrates an additional example of processor utilization for three example applications in accordance with one or more embodiments.

FIG. 5 illustrates an additional example 500 of processor utilization for the three example applications as shown in FIG. 3. In this example, the idle time service 134 described with reference to FIG. 1 has increased the idle duration for application 3 by 12 ms. The idle time service, however, has not modified the execution duration of application 1 or application 2. By extending the idle duration of application 3, the idle duration of the processor has increased to 8 ms for every other frequency. Correspondingly, the time that the processor is idle has increased from 50%, as illustrated in FIG. 3, to 58.3% in FIG. 5 by increasing the idle duration, and correspondingly the execution duration of only application 3. It is to be appreciated, therefore, that increasing the idle duration of background applications can significantly reduce the power consumption and extend the battery life of the device 100. Furthermore, by extending the execution duration of only background applications, interactive applications can still be executed without glitches.

In an embodiment, the idle time service 134 is implemented to determine a length of the idle duration that results in the greatest reduction in power consumption based on the hardware characteristics of device 100. For example, on a first device, an idle duration of 100 ms might result in the greatest reduction in power consumption. On a second device, however, 500 ms might result in the greatest reduction in power consumption. The idle time service can determine the hardware characteristics from the hardware, firmware, or drivers of the device. In particular, the idle time service can determine latencies and resiliency requirements of different hardware power states in the device. The idle time service can then determine the idle duration based at least in part on the latencies and resiliency requirements of the device.

Example methods 600 and 700 are described with reference to respective FIGS. 6 and 7 in accordance with one or more embodiments of an idle time service. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
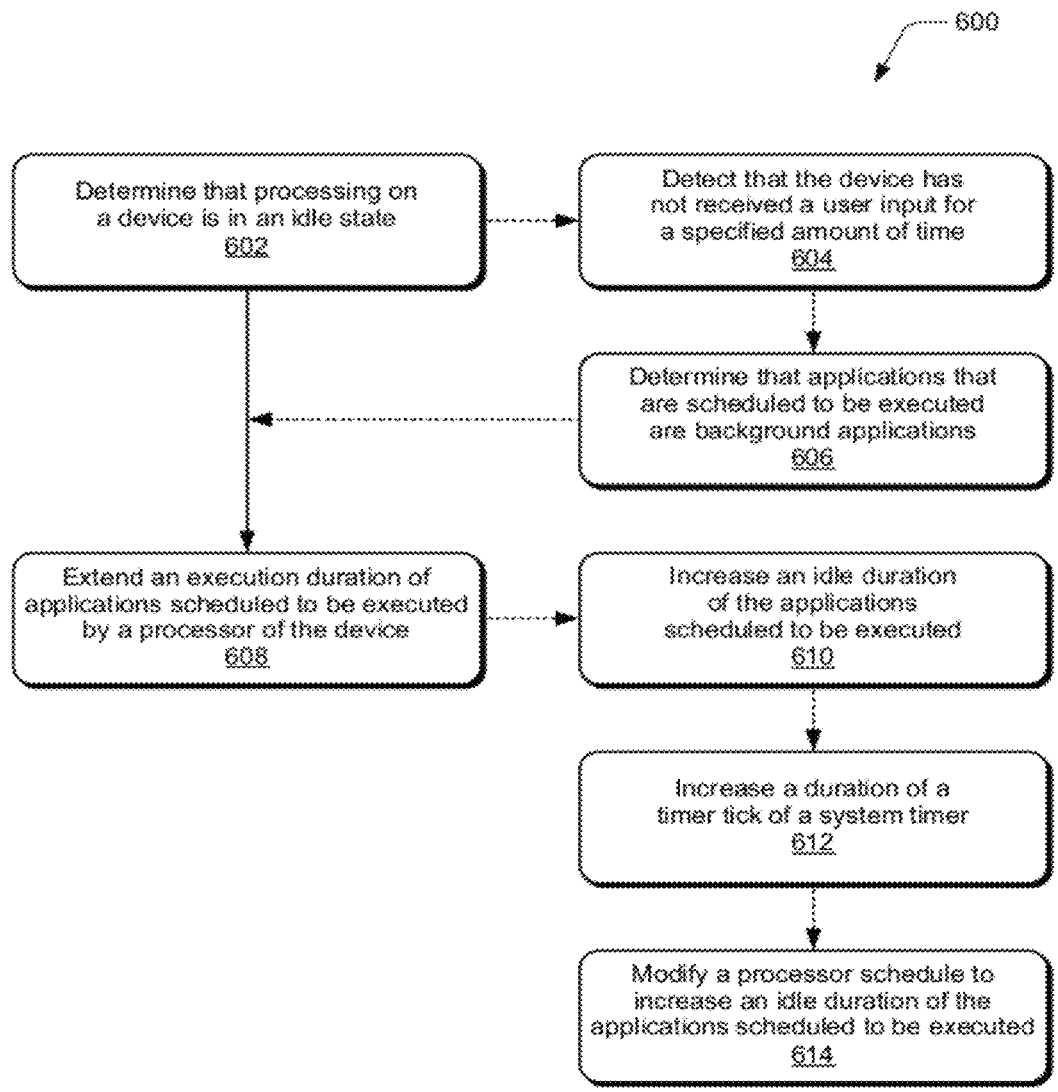
FIG. 6 illustrates example method(s) of an idle time service in accordance with one or more embodiments.

FIG. 6 illustrates example method(s) 600 of an idle time service, and is described with reference to the idle time service 134 of the device 100 shown in FIG. 1. The order in which the method blocks are described are not intended to be construed as a limitation, and any number of the described method blocks can be combined in any order to implement a method, or an alternate method.

At block 602, it is determined that processing on a device is in an idle state. For example, the idle time service 134 (FIG. 1) determines that processing on device 100 is in an idle state. To determine that processing on the device is in an idle state, the idle time service detects that the device has not received a user input for a specified amount of time (at block 604) and/or determines that the applications that are scheduled to be executed by the processor of the device are background applications (at block 606).

At block 608, an execution duration of applications that are scheduled to be executed by a processor of the device is extended to reduce power consumption by the device. For example, the idle time service 134 extends the execution duration of applications 122 that are scheduled to be executed by processor 118 of device 100 to reduce power consumption by device 100. To extend an execution duration of the applications, the idle time service increases an idle duration of the applications scheduled to be executed by the processor (at block 610); increases a duration of a timer tick of the system timer (at block 612); and/or modifies the processor schedule to increase the idle duration of the applications that are scheduled to be executed by the processor (at block 614).

Figure 7:
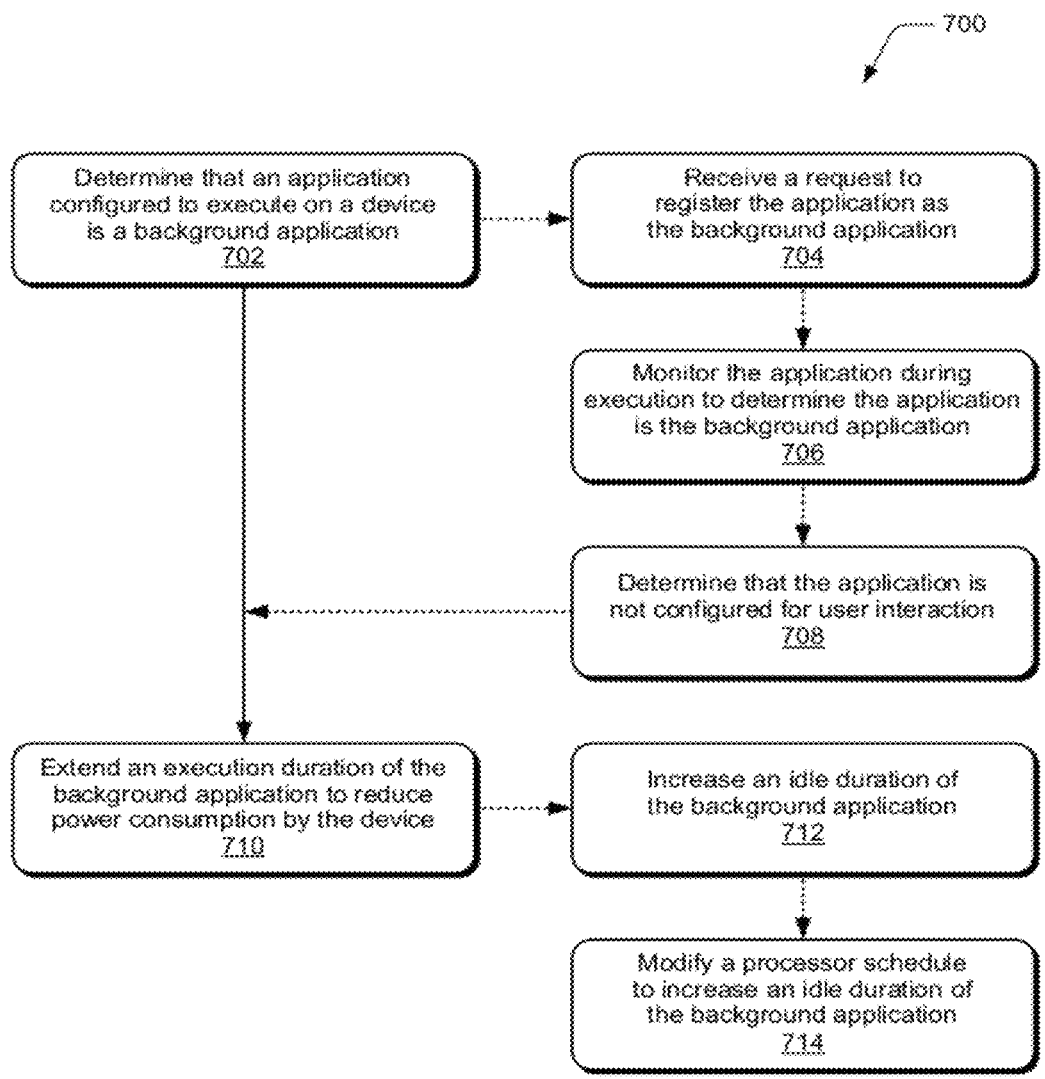
FIG. 7 illustrates additional example method(s) of an idle time service in accordance with one or more embodiments.

FIG. 7 illustrates example method(s) 700 of an idle time service, and is described with reference to the idle time service 134 of the device 100 shown in FIG. 1. The order in which the method blocks are described are not intended to be construed as a limitation, and any number of the described method blocks can be combined in any order to implement a method, or an alternate method.

At block 702, it is determined that an application configured to execute on a device is a background application. For example, the idle time service 134 (FIG. 1) determines that an application 122 configured to execute on device 100 is a background application 124. An application can be determined to be a background application when the idle time service receives a request to register the application as the background application (at block 704); when the idle time service monitors the application during execution to determine that the application is a background application (at block 706); and/or when the idle time service determines that the application is not configured for user interaction (at block 708).

At block 710, the execution duration of the background application is extended to reduce power consumption by the device. For example, the idle time service 134 extends the execution duration of application 122 to reduce power consumption by device 100. The idle time service can extend the execution duration of the background application by increasing an idle duration of the background application (at block 712) and/or by modifying the processor schedule to increase the idle duration of the background application (at block 714).

Figure 8:
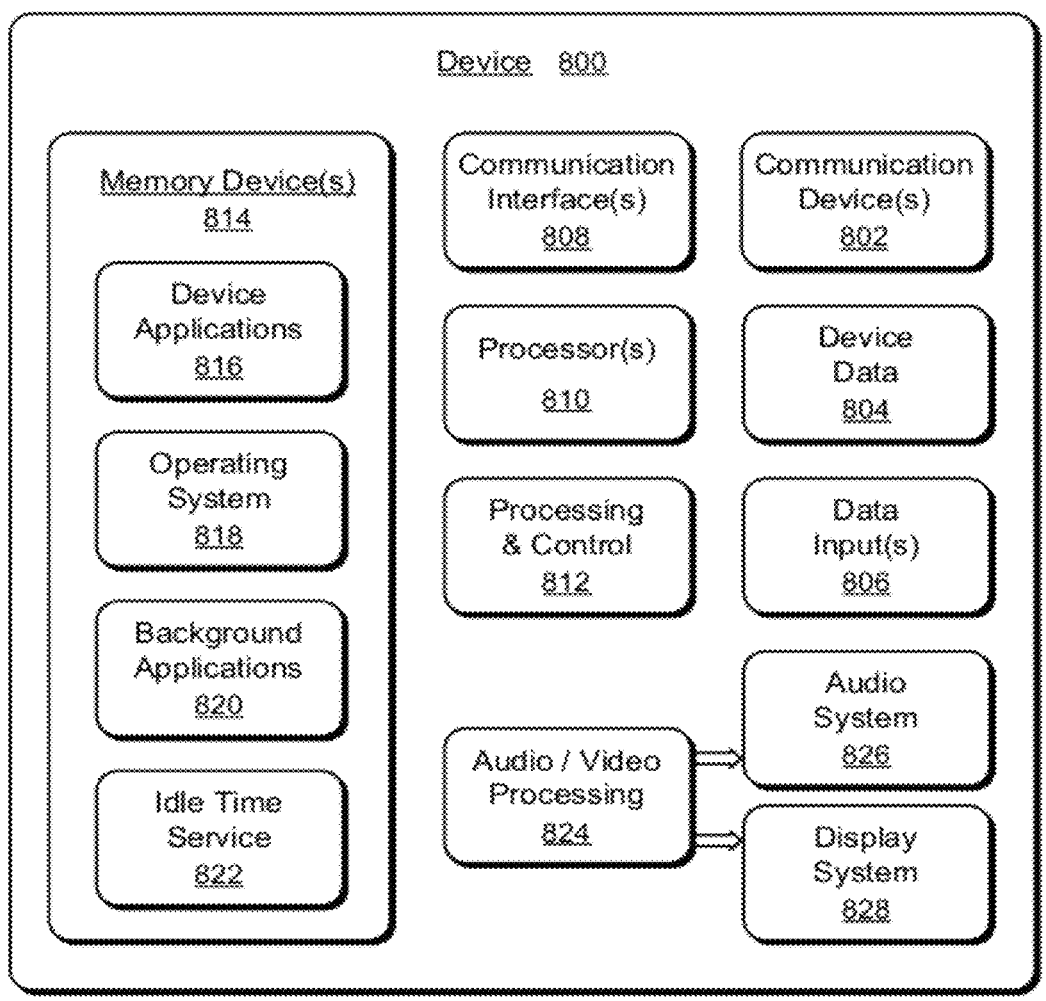
FIG. 8 illustrates various components of an example device that can implement embodiments of an idle time service.

FIG. 8 illustrates various components of an example device 800 that can be implemented as any of the devices, or services implemented by devices, described with reference to the previous FIGS. 1-7. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person)

and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 806 via which any type of data, media content, and/or inputs can be received, such as user-selectable inputs, messages, communications, music, television content, recorded video content, and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices (e.g., computer-readable storage media) 814 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 814 provides data storage mechanisms to store the device data 804, other types of information and/or data, and various device applications 816. For example, an operating system 818 can be maintained as a software application with a memory device and executed on the processors. The device applications may also include a device manager, such as any form of a control application, software application, signal processing and control module, code that is native to a particular device, a hardware abstraction layer for a particular device, and so on.

In this example, the device applications 816 include background applications 820. In addition, the device applications include an idle time service 822. The background applications and the idle time service are shown as software modules and/or computer applications. Alternatively or in addition, the background applications and/or the idle time service can be implemented as hardware, software, firmware, fixed logic, or any combination thereof.

The device 800 also includes an audio and/or video processing system 824 that generates audio data for an audio system 826 and/or generates display data for a display system 828. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of the idle time service have been described in language specific to features and/or methods, the subject of the appended claims is not necessarily limited to the specific features or methods described. Rather, the specific features and methods are disclosed as example implementations of the idle time service.

The invention claimed is:

1. A computer-implemented method, comprising:
    accessing a processor schedule to determine whether applications scheduled to be executed by a processor of a device are background applications;
    determining that processing on the device is in an idle state based on determining that all applications that are scheduled to be executed by a processor of the device are background applications; and
    responsive to determining that processing on the device is in an idle state, extending an execution duration of the background applications that are scheduled to be executed by a processor of the device to reduce power consumption by the device.

2. A computer-implemented method as recited in claim 1, wherein determining that processing on the device is in the idle state is further based on detecting that the device has not received a user input for a specified amount of time.

3. A computer-implemented method as recited in claim 1, wherein extending the execution duration of the background applications comprises increasing an idle duration of the background applications that are scheduled to be executed by the processor of the device.

4. A computer-implemented method as recited in claim 3, wherein the idle duration is extended based at least in part on hardware characteristics of the device.

5. A computer-implemented method as recited in claim 1, wherein extending the execution duration comprises increasing a duration of a timer tick of a system timer.

6. A computer-implemented method as recited in claim 1, wherein extending the execution duration comprises modifying the processor schedule to increase an idle duration of the background applications that are scheduled to be executed by the processor.

7. A computer-implemented method, comprising:
accessing a processor schedule to determine that an application configured to execute on a device is a background application; and
extending an execution duration of the background application during an idle state of processing on the device, based at least on hardware characteristics of the device, without modifying an execution duration of one or more applications that are not background applications, to reduce power consumption by the device.

8. A computer-implemented method as recited in claim 7, further comprising receiving a request to register the application as the background application, and said determining, based on the request, that the application is the background application.

9. A computer-implemented method as recited in claim 8, wherein the request is received from the application.

10. A computer-implemented method as recited in claim 8, wherein the request is received as a user input to the device.

11. A computer-implemented method as recited in claim 7, further comprising monitoring the application during execution to determine that the application is the background application.

12. A computer-implemented method as recited in claim 7, further comprising determining that the application is not configured for user interaction, and said determining, based on the application not being configured for user interaction, that the application is the background application.

13. A computer-implemented method as recited in claim 7, wherein extending the execution duration of the background application comprises increasing an idle duration of the background application.

14. A computer-implemented method as recited in claim 7, wherein extending the execution duration of the background application comprises modifying the processor schedule to increase an idle duration of the background application.

15. A device, comprising:
at least a memory and a processor to implement an operating system, the operating system including an idle time service configured to:
access a processor schedule to determine that an application configured to execute on the device is a background application; and
extend an execution duration of the background application during an idle state of processing on the device, based at least in part on hardware characteristics of the device, to reduce power consumption by the device.

16. A device as recited in claim 15, wherein the idle time service is further configured to monitor the application during execution to determine that the application is the background application.

17. A device as recited in claim 15, wherein the idle time service is further configured to extend the execution duration of the background application by increasing an idle duration of the background application.

18. A device as recited in claim 15, wherein the idle time service is further configured to extend the execution duration of the background application by modifying the processor schedule to increase an idle duration of the background application.

19. A device as recited in claim 15, wherein the idle time service is further configured to determine the hardware characteristics from the hardware, firmware, or drivers of the device.

* * * * *